March 3, 1931. W. D. THOMPSON 1,794,741
COMPOSITION FOR MAKING THIN BRITTLE SHELLS FOR COLD EDIBLES
Filed Oct. 30, 1922

Inventor
Willis D. Thompson
by Carl A. Crawford
Attorney

Patented Mar. 3, 1931

1,794,741

UNITED STATES PATENT OFFICE.

WILLIS D. THOMPSON, OF SPOKANE, WASHINGTON, ASSIGNOR OF ONE-THIRD TO CARL H. CRAWFORD, OF SPOKANE, WASHINGTON

COMPOSITION FOR MAKING THIN BRITTLE SHELLS FOR COLD EDIBLES

Application filed October 30, 1922. Serial No. 597,994.

This invention relates to an improved removable casing for a frozen confection such as ice cream or refrigerated edibles.

In attempting to dip an ice cream core into a hot bath, formed of material adapted to harden and envelope the core, I find that irrespective of the constituents of the bath, the latter cannot exceed 118 degrees F., and should be nearer 115 degrees F., or at least not far above the latter. Otherwise, the ice cream will melt before it can be withdrawn from the bath. If the core melts and runs before the casing hardens, then the casing will not confine the core because the latter will prevent hardening or setting of the casing. Paraffine, alone, cannot be worked successfully at temperatures much less than 118 degrees F., and this is the lowest melting point paraffine that the present market will supply. Further, paraffine, alone, at a practical fluidity, is of insufficient thickness and rigidity when hard, and thus the ice cream core is too quickly affected by surrounding temperatures and consequently, it softens during delivery and transit. Furthermore because it is so thin, and so liable to crack, it does not stand handling.

If stearine and paraffine are combined, the relatively higher melting point of the stearine, which is 140 degrees F., requires a dipping temperature of the bath which is too high for successfully working ice cream; this being true even though a much lesser amount of stearine is used as compared to the paraffine. While the stearine stiffens the paraffine, it does not thicken it, and when the shell or casing is broken, the pieces are so small that they, or some of them, are not readily removed from the surface of the core.

I have discovered that by using asphalt, in combination with paraffine, I can not only obtain a thicker casing or shell, and hence protect the ice cream for a longer period from the higher surrounding temperatures, but in addition, the asphalt not only hardens the shell under the cooling action of the core but also thickens the shell thereby making the article more safely transportable.

While asphalt is viscous when soft at a temperature of say 80 degrees F., and is usually a very disagreeable material to handle, I have discovered that if combined in certain proportions with paraffine, this sticky characteristic is not perceptible. Therefore, it is a feature of my invention, specifically, to combine paraffine and asphalt in certain specific proportions, in addition to the combination of the two, broadly.

I have also discovered that asphalt, with a melting point of 108 to 110 degrees F., in combination with paraffine, will retain the bath, liquid, when stirred, at a temperature below the melting point of paraffine. In fact, I can obtain a dipping temperature as low as 115 to 116 degrees F., sary fluidity as 115 to 116 degrees F., which is, as far as I am aware, a temperature at which ice cream can be dipped without causing it to melt and thus preventing the casing from setting.

A further feature of my invention, and one that is commercially very important, consists in the addition of a stiffener, preferably stearine, employed in a minute proportion with respect to the paraffine and asphalt. With this slight addition of stearine, the shell, when broken, can be removed in much larger pieces, and there is a very materially less amount of granules of the casing left on the surface of the core.

My invention will be more fully described in connection with the accompanying drawing and will be more particularly pointed out in and by the appended claims.

In the drawing:—

Figure 1:
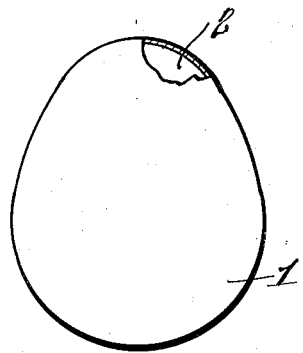
Fig. 1, is a view of the article of confection shown in the form of an egg, with a portion of the shell broken away to show the thickness of the shell.
Figure 2:
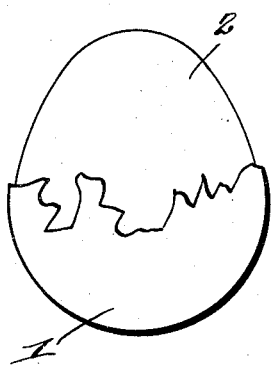
Fig. 2, is a view of the same after the purchaser has tapped and broken one end of the shell and removed the same in readiness to eat the core.

I will next describe one method of carrying out my invention.

When I employ only paraffine and asphalt, as is entirely practical, I first melt the paraffine in a receptacle surrounded with hot water so that a uniform temperature can more readily be maintained. The lowest melting point paraffine now on the market, that is within reason as regards cost, has a melting point of about 118 degrees F. It would melt at 116 degrees F., but in most cases, the material would not be of sufficient fluidity. At 118 degrees F., the paraffine is about the consistency of a light lubricating oil and is of amply sufficient fluidity to be continuously workable as a dipping bath. To four parts of paraffine, I add one part asphalt, having a melting point of from 108 to 110 degrees F. Of course, the asphalt will not only quickly melt, but when stirred, it will combine with the paraffine turning the latter to the dark hue of the asphalt. After these two ingredients become sufficiently fluid, I reduce the temperature of the resultant dipping bath to 115 degrees F. and continue to stir and agitate the bath while dipping at this temperature.

In practicing the process, I have employed an asphalt sold under the trade-name of "Calol asphalt". This asphalt is listed as a "D" grade having a penetration of 51 to 60 at a temperature of 115° C.

At this point, I desire to emphasize some important features of asphalt, in this utility.

Asphalt, having a lower melting point than paraffine, prevents the latter from setting when the temperature of the dipping bath is reduced below the melting point of the paraffine but above the melting point of the asphalt. It is because of this feature, that I can work with a dipping temperature down as low as 115 to 116 degrees F., which has never before been done where paraffine has been involved, as far as I know. This temperature, I have found in actual practice, is about the maximum at which ice cream can be dipped into a hot bath and withdrawn quickly enough so that the casing will set before the ice cream melts or softens, appreciably. It will now be clear, that in addition to other advantageous functions of the asphalt, the latter performs the very important function of affording a dipping temperature sufficiently low so that the ice cream will not melt before the casing sets about it. Hence, my adoption of asphalt is not a mere matter of selection, since it coacts with the paraffine, as set forth, not only in an extremely useful manner, but also in a manner entirely novel.

Wholly apart from and in addition to the broad idea of combining paraffine and asphalt, for this purpose, I find that in substantially the specific proportions of four parts paraffine to one part asphalt, the former so completely takes up the latter that at no extreme of normal living temperature is the asphalt sticky. Of course, the ice cream core will not permit of the temperature of the casing rising very high, but nevertheless, there is no trace of stickiness appreciable from the asphalt. It is my theory that when there is not more than one fourth asphalt, the preponderance of paraffine, as it were, completely surrounds and envelops the asphalt, and thereby prevents the latter from becoming sticky. If I use half asphalt and half paraffine, the asphalt is very appreciably sticky, after removal of portion of the shell, and the casing could not be handled without smearing the fingers, even at such a low temperature as 80 degrees F.

Having reduced the bath to the aforenamed dipping temperature, I next pick up the ice cream cores, which may have been molded in egg form, and dip them quickly into, and as quickly withdraw them from the liquid bath. Instantly, upon withdrawal, the shell hardens and becomes cool. When first withdrawn from the bath, the casing, which I will designate as 1, is black and has the luster of pitch, but when subjected to a surrounding temperature of about 70°, a very perceptable "frost" appears on the surface which is transparent. The shell or casing 1, has approximately the thickness of a hen's egg shell. It is air tight and impervious to moisture. When the dipping hook is withdrawn from the encased core, I "touch" the resultant opening with a portion of the liquid bath, to seal the shell, and I find that no other openings are present. The fact that the ice cream does not melt or become soft, is proven by subsequently breaking the shell and removing portions thereof, which clearly reveals the fact that the shell 1, is not only in close contact with the ice cream 2, but the surface of the latter is as hard as the interior, as far as I can determine.

The temperature of the core of ice cream keeps the temperature of the asphalt and paraffine so far below their respective melting points that the casing attains a rock-like hardness. Further, the asphalt is extremely brittle, in addition to being hard. I have removed portions of the bath, let the same set in a living temperature of say 70 degrees F., and have found that instead of attaining a rock-like hardness, it is tough and easily pliable in the absence of the cooling action of the core. This is a well known characteristic of both paraffine and asphalt, at such a temperature. However, the importance of this feature is of great moment when it is considered that with the preferred mixture, those portions of the shell removed from the ice cream core are not sticky. Thus, if a child peeled off the shell and threw the pieces on the floor, these pieces could be tramped on and would not adhere to the floor or carpet.

Thus far described, the articles can be readily handled and transported even at a temperature of 70 degrees F., although in practice they will be disposed in iced packers, and so retained, by the retailer until sold to the public. When a purchaser buys one of the articles, he will gently tap the smaller end of the egg onto a hard surface, sufficiently to crack the shell. Then a desired portion of the cracked shell can be removed much after the manner of removing the shell of a hard boiled egg, the remaining portion of the shell affording the user a means of holding the article in the fingers without soiling the latter.

I have found that with the addition of substantially one thirty-second part of stearine, the shell will break into larger pieces and will not crumble into small granules, when cracked. This is an important feature, although not essential.

Hence, in this form of the invention, I melt in a separate vessel, the requisite quantity of stearine, which has a melting point of about 140 degrees F. After the stearine is melted, I pour it into the bath of melted paraffine and asphalt, and stir thoroughly to mix. Before pouring the stearine into the dipping bath, I find it advantageous to raise the temperature of the bath from its dipping temperature of 115 degrees F., to about 160 degrees F., and stir the mass well. This thoroughly mixes the stearine with the asphalt and paraffine, and then the liquid mass can be reduced to the working temperature of 115 degrees F., and so retained in operative liquid form.

The little granules that result when the shell is cracked and broken, in the absence of stearine, are slightly objectionable when the shell is employed on a frozen edible, such as ice cream, for the reason that the surface of the latter is sufficiently soft and the particles cannot be brushed off. However, when the shell is used on refrigerated apples or on a paper-coated piece of refrigerated butter, these few particles can readily be removed, and hence are not objectionable. Thus it is clear that while the addition of stearine does improve the shell for certain purposes, this does not constitute a different invention from a shell made up of a wax-like substance of paraffin and asphalt, which can be successfully used on ice cream without stearine.

As nearly as I can determine, the asphalt thickens the paraffine, and the latter prevents the asphalt from becoming too thick. This follows from the fact that paraffine alone, makes a shell too thin, and further, while the paraffine is brittle, it is so slightly so that it crumbles into small pieces when broken. Asphalt, alone, makes a shell so thick that before the ice cream cools and sets the shell, the surface of the ice cream softens very materially. However, paraffine and asphalt, together, overcome all difficulty. With this combination, the shell, due to the asphalt on the frozen core, is very hard and very brittle and cracks into large pieces, and is air tight and impervious to moisture, which are valuable properties in a shell for this purpose. The slight addition of stearine, renders the shell stiffer, and causes it to break into large pieces with an almost total absence of granules.

Now it has been pointed out that asphalt enables me to retain the bath, liquid, at a temperature lower than the melting points of either paraffine or stearine. In addition the asphalt imparts to the shell a rock-like hardness because of the cold core and also a thickness which not only facilitates handling, with less liability of breakage, but because of the thickness, transmission of the surrounding high temperatures through the shell is resisted to such an extent that the ice cream is retained in a frozen and hard condition for a very long period. Thus it will be seen that the asphalt performs two very useful functions in the make-up of this shell. Besides not being sticky on the exterior, the shell does not adhere to the ice cream.

The purpose of this invention is to provide a casing for ice cream whereby I can appeal to children, as well as adults, with a product which is not only inexpensive, but which is strikingly novel in shape and appearance, and which in efficiency is incomparably beyond any casing I know of for cheaply enclosing ice cream in small retail quantities.

I claim:—

1. A non-flavor imparting composition for forming a removable shell contacting directly with and conforming to the surface of a naked edible, comprising a mixture of paraffin and asphalt, the proportion of paraffin being more than three times that of the asphalt, said composition being brittle when chilled to a temperature below 70° F.

2. A non-flavor imparting composition for forming a removable shell contacting directly with and conforming to the surface of a naked edible, containing a mixture of paraffin, asphalt and stearin, the proportion of paraffin being more than three times that of the asphalt, with not more than one-twentieth part of stearin.

3. A removable protecting casing for a solid edible comprising a mixture of paraffin and asphalt in a layer of substantially egg shell thickness in such proportions as to form at normal living temperature a brittle, breakable protecting casing when contacting with and conforming to the shape of the edible.

4. A removable protecting casing for a solid chilled edible comprising a mixture of paraffin and asphalt in such proportions as to form at normal living temperature a brittle, breakable protecting casing contacting with and conforming to the shape of the edible, said mixture having a small proportion of stearin for hardening the coating.

5. As an article of manufacture, a block of ice cream hermetically surrounded by a non-sticky, removable protecting and heat-insulating casing comprising a mixture of paraffin and asphalt in such proportions as to form at normal living temperature a brittle, breakable casing contacting with and conforming to the shape of the edible, said mixture having a small proportion of stearin mixed therewith to harden it whereby to increase the size of the fragments when the casing is broken, said mixture being semi-fluid at a temperature not exceeding 116° F.

6. A removable insulating protecting casing contacting directly with and conforming to the surface of a naked chilled edible, comprising a mixture of paraffin and asphalt with the former in preponderant proportion to the latter so that the mixture for the casing melts at slightly above normal maximum atmospheric temperature, and the casing itself is maintained in a non-sticky condition by the chilled edible therein, said casing being of substantially egg shell thickness and formed by momentary dipping into the liquid mixture so that the casing is immediately hardened upon withdrawal by the action of the chilled edible and the surrounding atmosphere.

In testimony that I claim the foregoing as my own, I hereby affix my signature.

WILLIS D. THOMPSON.